(12) United States Patent
Konieczny (10) Patent No.: US 7,961,571 B2
(45) Date of Patent: Jun. 14, 2011

(54) RECORDING A DIGITAL SIGNAL ON AN INFORMATION CARRIER COMPRISING A FIRST LAYER AND A SECOND LAYER

(75) Inventor: Pawel Andrzej Konieczny, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 459 days.

(21) Appl. No.: 11/995,012

(22) PCT Filed: Jul. 7, 2006

(86) PCT No.: PCT/IB2006/052302
§ 371 (c)(1), (2), (4) Date: Jan. 8, 2008

(87) PCT Pub. No.: WO2007/007258
PCT Pub. Date: Jan. 18, 2007

(65) Prior Publication Data
US 2008/0205217 A1 Aug. 28, 2008

(30) Foreign Application Priority Data
Jul. 13, 2005 (EP) .................................. 05106400

(51) Int. Cl.
*G11B 7/00* (2006.01)
(52) U.S. Cl. .................. 369/47.32; 369/47.3; 369/47.33
(58) Field of Classification Search ............... 369/47.33, 369/47.32
See application file for complete search history.

(56) References Cited

U.S. PATENT DOCUMENTS

| | | | |
|---|---|---|---|
| 5,737,481 A | 4/1998 | Gushima et al. | |
| 6,065,094 A | 5/2000 | Akiyama | |
| 6,590,607 B1 | 7/2003 | Taussig | |
| 6,678,227 B1 | 1/2004 | Kondo et al. | |
| 7,426,330 B2 * | 9/2008 | Matsuno et al. | 386/46 |

(Continued)

FOREIGN PATENT DOCUMENTS

CN 1259733 A 7/2000

(Continued)

OTHER PUBLICATIONS

Nathans S F: "Building and Burning Dual-Layer DVD", Emedialive, Apr. 2004, XP002385644, Retrieved From the Internet: URL:http://www.emedialive.com/Articles/PrintArticle.aspx?ArticleID=8421>.

(Continued)

*Primary Examiner* — Lixi Chow (57) ABSTRACT

A recording method, particularly suitable for use in a digital video-camera, is described according to which a digital signal (10), deriving from the encoding of an audio-video signal is temporarily stored in a buffer (11) and from there recorded in a dual layer DVD (12) in successive recording intervals (22) or packets. The start/stop of a recording interval is normally controlled according to the level (15) of filling of the buffer. The digital signal is partitioned in portions that need to be entirely recorded on one single layer, and this triggers the need for a layer jump independently from the level of filling of the buffer. In order to avoid starting a layer jump with the buffer already partly filled, and therefore having a short non-recording interval (23) when time is mostly needed for calibrations, it is proposed to adjust the resolution in the encoding of the audio-video signal so as to have the buffer close to empty when the layer jump occurs.

10 Claims, 7 Drawing Sheets

U.S. PATENT DOCUMENTS

| | | | |
|---|---|---|---|
| 7,689,106 B2* | 3/2010 | Ono et al. | 386/131 |
| 2001/0015943 A1* | 8/2001 | Kuroda et al. | 369/47.33 |
| 2004/0156294 A1 | 8/2004 | Watanabe et al. | |
| 2005/0025011 A1* | 2/2005 | Gabryjelski | 369/47.33 |
| 2006/0133775 A1* | 6/2006 | Ju | 386/95 |

FOREIGN PATENT DOCUMENTS

| | | |
|---|---|---|
| EP | 0724256 A2 | 7/1996 |
| EP | 1018741 A1 | 7/2000 |
| WO | 2004102556 A2 | 11/2004 |
| WO | 2005013639 A2 | 2/2005 |

OTHER PUBLICATIONS

Labarge, R: "DVD Authoring & Production", CMP Books, pp. 220-222, Sep. 2001, XP002423984.

ISR/Written Opinion of the International Searching Authority PCT/IB2006/052302.

* cited by examiner

RECORDING A DIGITAL SIGNAL ON AN INFORMATION CARRIER COMPRISING A FIRST LAYER AND A SECOND LAYER

The invention relates to a method of recording a digital signal on an information carrier comprising a first layer and a second layer, comprising the steps of:
  storing the digital signal in a buffer at a storing rate, of
  recording the digital signal stored in the buffer on the first layer, until a storage space available on the first layer is filled, which recording is started when the buffer has been filled up to a predetermined high level, and stopped when the buffer has been emptied down to a predetermined low level.

The invention further relates to an apparatus for recording a digital signal on an information carrier comprising a first layer and a second layer, comprising:
  a buffer for the storage of the digital signal at a storing rate,
  a recording unit, for recording the digital signal stored in the buffer on the first layer, until a storage space available on the first layer is filled, and
  a start/stop unit for controlling the recording unit to start recording when the buffer has been filled up to a predetermined high level, and stop recording when the buffer has been emptied down to a predetermined low level.

A method of recording of the type indicated in the opening paragraph is known from EP0724256A2. This document describes the recording of information on an optical disc having a first layer and a second layer. The information, which is received from an external apparatus, is temporarily stored in a buffer and from there fetched to be recorded on the optical disc. The recording is effected on the first layer as long as there is storage space available, and on the second layer thereafter. The rate at which the information is recorded on the optical disc is higher than the rate at which the information is stored on the buffer, and the recording is repeatedly started/stopped according to the level to which the buffer is filled. Therefore the recording takes place in a succession of recording intervals or packets, separated by non-recording intervals. An optimization operation of the tracking and focus control, which is required when a layer jump from the first layer to the second layer is effected, to optimize the tracking and focus control for the second layer, can be carried out during a non-recording interval, involving no additional delay in the recording.

In a particular circumstance the information to be recorded is structured as a sequence of portions, where an individual portion needs to be recorded completely in one layer, i.e. not across several layers. Since the size of the portions is known, so as is also known the storage space available on the first layer at any time, it can be established until which portion the digital signal can be recorded on the first layer; subsequent portions are to be recorded on the second layer because the space available on the first layer is not sufficient to accommodate it. After the last portion to be recorded on the first layer has been completely recorded, the recording is forcibly stopped, regardless of what is the level of information present in the buffer. At that moment the level of filling of the buffer will generally be higher than the predetermined low level, and therefore the time required for the buffer to reach the predetermined high level will be shorter than usual non-recording intervals. Therefore the known method has the disadvantage that, if applied to a digital signal consisting of a sequence of portions, where any individual portion needs to be recorded on one same layer, leads to potentially short and insufficient non-recording intervals, in correspondence of the layer jump when time for executing the optimizing operation is mostly needed.

It is an object of the present invention to provide a method of the type described in the opening paragraph which can be applied to a digital signal consisting of a sequence of portions, where any individual portion needs to be recorded on one same layer, allowing for a longer non recording interval, in correspondence of the layer jump.

It is a further object of the present invention to provide an apparatus of the type described in the opening paragraph adapted for recording a digital signal consisting of a sequence of portions, where any individual portion needs to be recorded on one same layer, allowing for a longer non recording interval, in correspondence of the layer jump.

According to the invention the first object is achieved by a method as claimed in claim 1, that means in particular that the storing rate is adjusted so that the buffer has been emptied down to the predetermined low level when the last portion has been completely recorded.

In this way it is obtained that the time available until the buffer is filled up will generally be longer. In fact, the time required for the buffer to be filled up depends on the space available in the buffer and on the rate at which the buffer is filled up, which is equal to the storing rate minus the recording rate, i.e. the rate at which the digital signal stored in the buffer is recorded on the information carrier.

During a non-recording interval there is no recording and thus the rate at which the buffer is filled up is exactly equal to the storing rate.

During a layer jump the disc cannot be recorded, nor it can immediately following the layer jump, since the calibration of a number of control parameters is necessary before the recording can be resumed, thus the non-recording interval which has started when the recording of the last portion on the first layer has been accomplished, herein referred as the "layer jump non-recording interval", cannot end until said calibrations have been completed. All along this layer jump non-recording interval the digital signal is stored in the buffer memory, and thus the buffer memory has to be large enough for the duration of the layer jump non-recording interval, otherwise part of it may be lost with unacceptable consequences. For this reason it is convenient to have the buffer as empty as at the beginning of any other non-recording interval at the time when the layer jump non-recording interval begins.

In view of the foregoing it can be understood that with a given time required for the calibrations and a given size of the buffer, the possibilities of a buffer overflow can be avoided or at least reduced by having the buffer rater empty when the layer jump non-recording interval starts. Similarly it can be said that given the time required for the calibrations, the size of the buffer required to avoid the possibilities of a buffer overflow is reduced by having the buffer rather empty when the layer jump non-recording interval starts. For the same reasons it is also advantageous to have the storing rate reduced during the layer jump non-recording interval.

The storing rate of the digital signal may be influenced in various manners. If the digital signal is transferred from another storage device to the buffer, then the storing rate can be influenced by varying the rate of transfer from the other storage device.

Of more concern is the situation of a the digital signal which is generated as the result of the processing by processing means of an input signal received at an input of the processing means, where the receiving of the input signal cannot be slowed down, accelerated, or stopped. In an embodiment of the method according to the invention, the input signal may be another digital signal, the processing means being a compression block that compresses the other digital signal in the digital signal with a selectable compression rate: in this case it is possible to influence the storing rate by varying the compression rate, as claimed in claim 2.

In a different embodiment, the input signal may be an analogue signal, the processing means being an encoding block that converts the analogue signal in the digital signal with a selectable degree of resolution: in this case the storing rate can be varied by varying the degree of resolution, as claimed in claim 3. Of particular interest is the situation in which the analogue signal is a real-time audio-video signal, as claimed in claim 5, which recording cannot be stopped, the sanction being the loss of the audio-video signal during an interval of time.

Other advantageous embodiments are claimed in the other dependent claims.

As it will appear clear from the foregoing discussion, the further object is achieved according to the invention by an apparatus as claimed in claim 10. All optional features of the method according to the invention defined in the dependent claims can be translated into corresponding optional features for the apparatus according to the invention.

These and other aspects of the method and apparatus according to the invention will be further elucidated and described with reference to the drawings. In the drawings.

Figure 1:
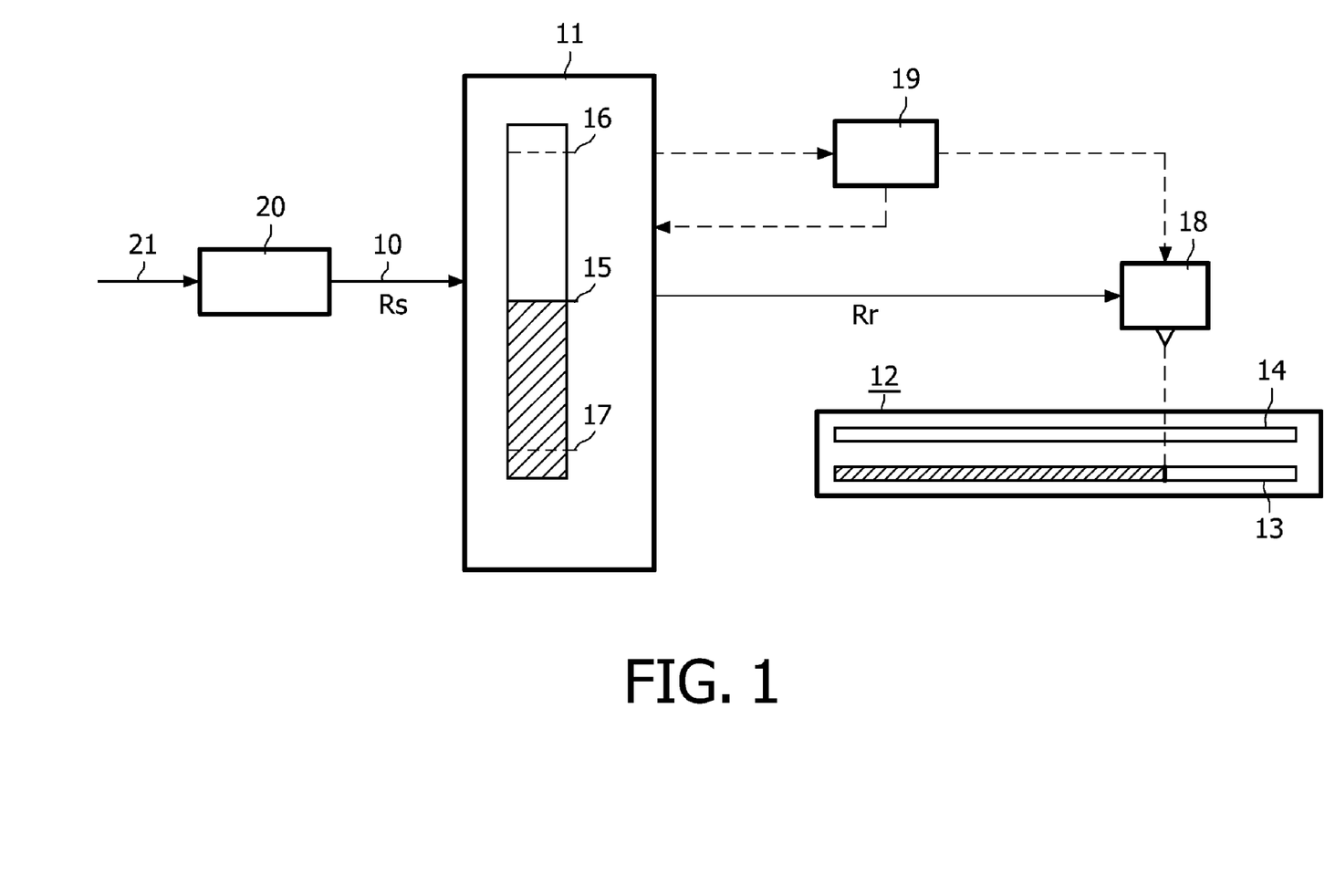
FIG. 1 shows a buffer where a digital signal to be recorded on a multi-layer information carrier is temporarily stored.

The digital signal 10 is temporarily stored in the buffer 11 at a storing rate Rs, from where it is fetched to be recorded at a recording rate Rr on the multi-layer information carrier 12, which has a first layer 13 and a second layer 14. At a given moment the buffer is filled at a level 15 which varies reflecting the difference between the storing rate Rs and the recording rate Rr.

The storing rate Rs may be fixed or variable. The recording can be activated/deactivated, and generally, when activated, the recording rate Rr is constant and higher in value than the storing rate Rs in average, otherwise a buffer overflow would occur at some point. When the recording is not activated the level 15 of filling in the buffer 11 increases at a rate equal to the storing rate Rs; when the recording is activated the level 15 of filling in the buffer 11 decreases at a rate equal to Rr−Rs; the recording is controlled to be activated when the level 15 has increased up to a predetermined high level 16 and deactivated when the level 15 has decreased down to a predetermined low level 17. The predetermined high level 16 and the predetermined low level 17 are close to a situation of buffer full and empty, respectively. The predetermined high level 16 for example could be chosen as a level where 90% or more of the buffer is full, but not 100%, otherwise a buffer overflow could not be prevented anymore. The optimal determination of the predetermined high level 16 reflects design considerations like the time requested to activate the recording, the maximum storing rate and the buffer size. Similar considerations can be applied to the predetermined low level 17 as well, except for the fact that in some situations the condition of buffer empty can be perfectly acceptable or even desirable, so that fixing the predetermined low level 17 to 0% is in general possible.

The buffer 11 can be comprised in an apparatus for recording the multi-layer information carrier 12, the apparatus further comprising recording means 18 which are activated/deactivated by a start/stop unit 19, upon reaching the predetermined high level 16/low level 17 in the buffer 11.

In an embodiment the digital signal 10 is output by processing means 20 as a result of processing an input signal 21, which input signal 21 may be itself another digital signal or an analogue signal, particularly a real-time audio video signal.

Figure 2:
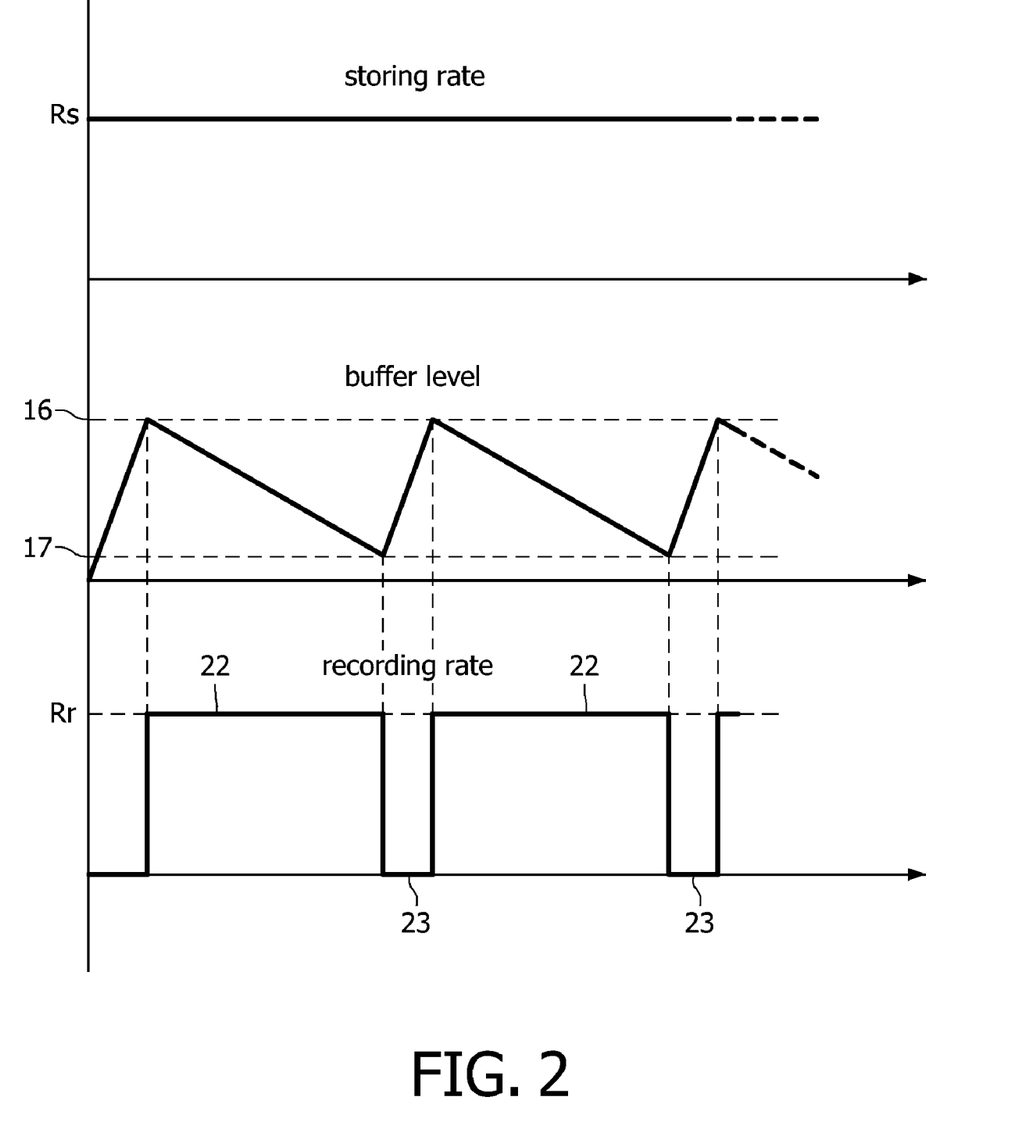
FIG. 2 shows the level of filling in the buffer while recording a digital signal, not including the occurrence of a layer jump.

FIG. 2 shows the level of filling in the buffer while recording the digital signal.

For sake of simplicity, the situation in which the storing rate Rs is constant is considered. The first line represents the storing rate Rs having a constant value; the second line represents the level 15 of filling in the buffer 11 which during normal operation varies between the predetermined high level 16 and the predetermined low level 17, indicated with respective dotted lines: the level 15 in the buffer 11 initially increases at the storing rate Rs, until the predetermined high level 16 is reached and the recording, shown by the third line, is activated. Consequently, the level 15 in the buffer 15 decreases at a rate equal to Rr−Rs, until the predetermined low level 17 is reached and the recording is deactivated, and so on, giving rise to a "saw tooth" shape. Therefore the recording takes place in recording intervals 22, or "packages", separated by non-recording intervals 23. The duration of the non-recording intervals 23 and the recording intervals 22 is determined by the values of the storing rate Rs, recording rate Rr, predetermined high level 16, predetermined low level 17 and by the size of the buffer 11.

The recording takes place initially on the first layer 13, which is progressively filled until a storage space available therein is exhausted; then the recording is suspended, a layer jump takes place and the recording is resumed on the second layer 14, not before control parameters have been adjusted for writing on the second layer 14 though. It is possible, and sometimes desirable, to effect a layer jump before the first layer is completely recorded: in this case a storage space available on the first layer must be intended as a subset of the recording area represented by the first layer.

It is clear what the impact is of a variation of the storing rate Rs: if the storing rate Rs increased the level 15 in the buffer 11 would increase faster during the non-recording intervals 23 and would decrease more slowly during the recording intervals 22, leading to shorter non-recording intervals 23 and longer recording intervals 22; vice versa, if the storing rate Rs decreased, then the level in the buffer 11 would increase more slowly during the non-recording interval 23 and would decrease faster during the recording intervals 22, leading to longer non-recording interval 23 and shorter recording intervals 22.

All these considerations can easily be extended to the case in which the storing rate Rs is variable instead of constant.

In a specific situation, which is dealt with by the present invention, the digital signal can be seen as partitioned in portions, for which portions there is the requirement that any individual portion has to be recorded entirely on one layer, i.e. not across two or more layers. In this case only those portions that can be entirely accommodated on the first layer 13 can effectively be recorded therein. This implies that the digital signal 10 cannot in general be recorded on the first layer 13 up to the complete filling of its storage space, because this condition will in general not coincide with the end of a portion. In general it can be said that while recording it will be necessary to identify the last portion to be recorded, and after having completely recorded said last portion, the layer jump has to take place even if there is still storage place available on the first layer 13: this can be accomplished for example by monitoring with suitable means the space available before starting to record a portion and by avoiding recording a portion that cannot fit in the remaining space in the first layer 13.

Figure 3:
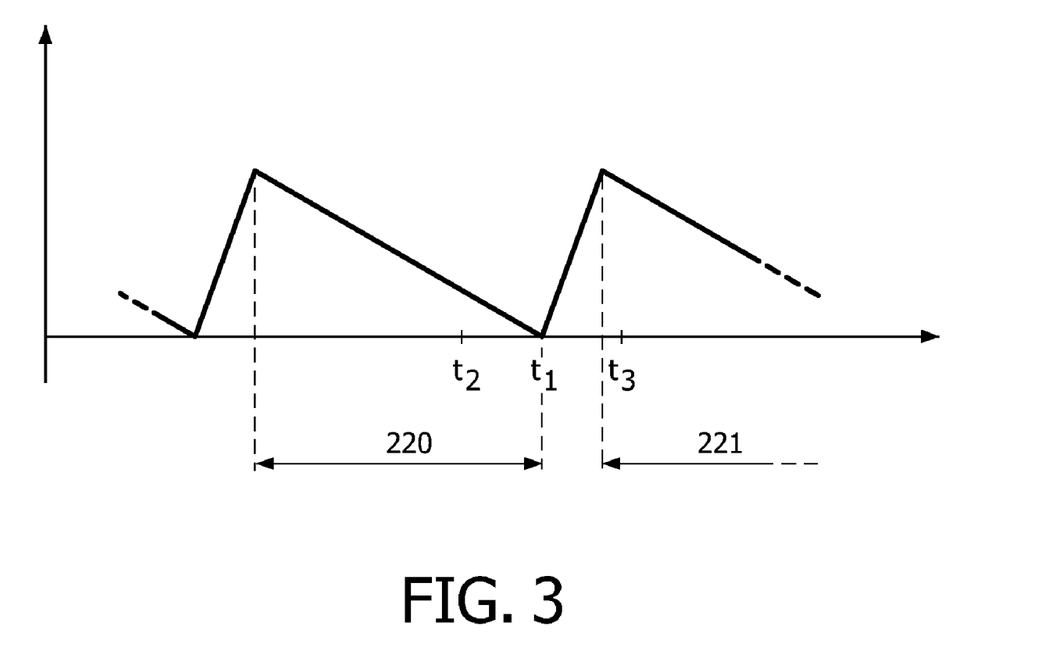
FIG. 3 shows the level of filling in the buffer while recording a digital signal formed by portions, not including the occurrence of a layer jump.

FIG. 3 shows the level of filling in the buffer while recording a digital signal formed by portions, not including the occurrence of a layer jump.

The digital signal 10 is in fact a digital representation of digital data, which for various reasons may need to be partitioned, the elements resulting from such a partition, sometimes referred to as frames, blocks or cells, corresponding to said portions of the digital signal.

The level 15 in the buffer 11 has the typical saw tooth shape already shown in FIG. 2.

It has to be understood that the condition that causes a recording interval 220 to end is completely independent of the partition of the digital signal 10. In fact, while considering how the ending of the recording of a portion of the digital signal can take place in respect with the ending of a recording interval 220, three distinct possibilities are given (in this case, for sake of simplicity it is assumed that the predetermined low level 17 corresponds to zero %):

the first possibility is that the recording of the portion of the digital signal is accomplished at a time t1 concomitantly with the end of the recording interval 220, the second possibility is that the recording of the portion of the digital signal is accomplished at a time t2 somewhat before the end of the recording interval 220, the third possibility is that the recording of the portion of the digital signal is accomplished at a time t3 after the end of the recording interval 220, more in particular at the early stages of the subsequent recording interval 221.

How the ending of the recording of a portion of the digital signal takes place in respect with the ending of a recording interval 220 has no relevancy as long as no layer jump is involved but has important implications at the moment when a layer jump occurs.

In fact, in the event that a portion is the last portion to be recorded on the first layer, i.e. the last portion that fits on the storage space available on the first layer, the recording is suspended and a layer jump is effected, forcing a non-recording interval, the layer jump non-recording interval, regardless of the level 15 in the buffer 11 at the moment when the recording is suspended.

Figure 4A:
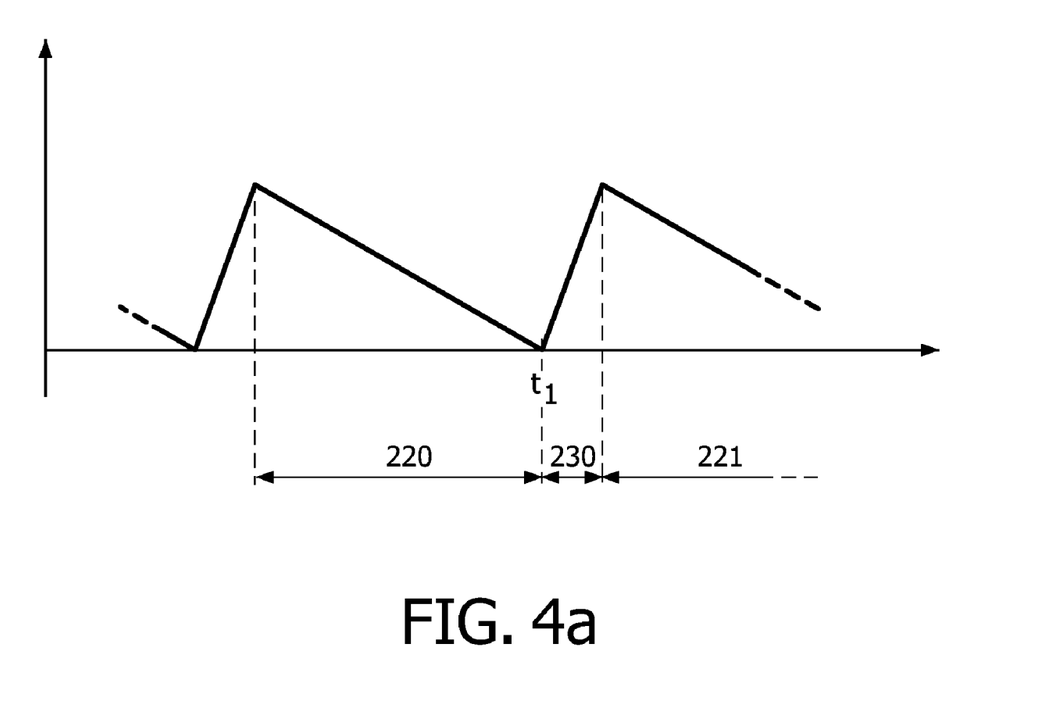
FIGS. 4a-4c show the level of filling in the buffer while recording a digital signal formed by portions, including the occurrence of a layer jump, in various situations.
Figure 4B:
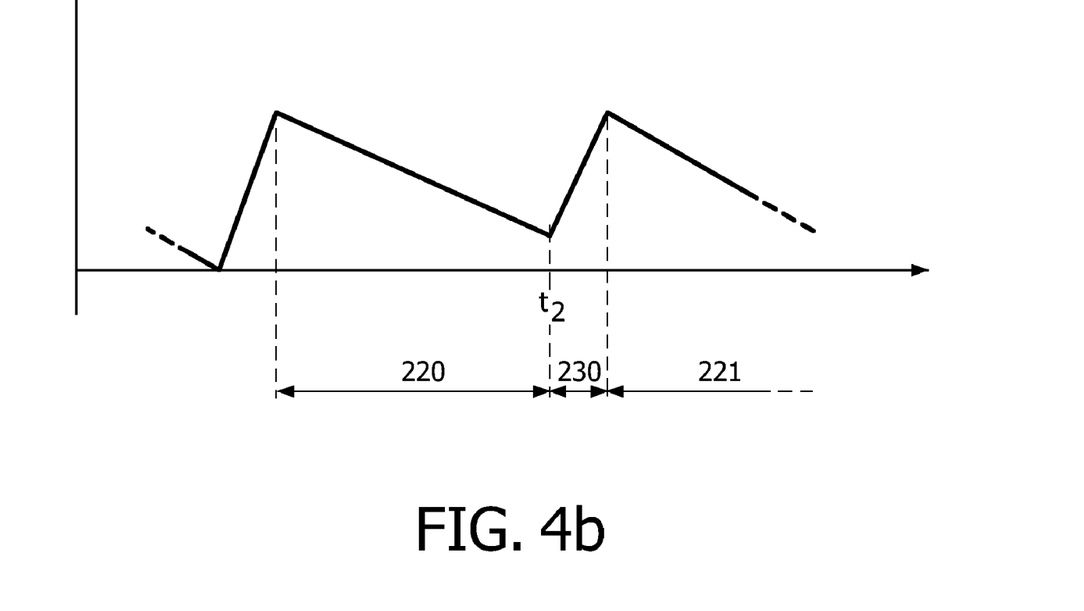
Figure 4C:
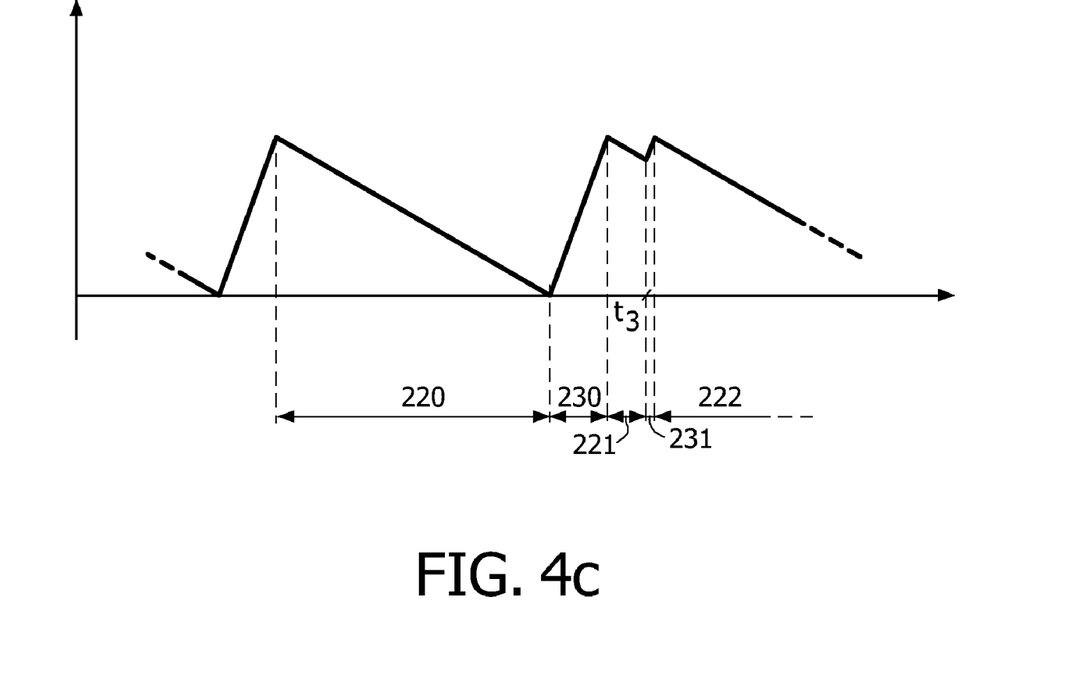

This can be further understood with reference to FIG. 4, showing the level of filling in the buffer while recording a digital signal formed by portions, including the occurrence of a layer jump.

In FIG. 4a the first situation is depicted, according to which this last portion would be completely recorded at the time t1: in this case the recording interval 220 would end with the level 15 in the buffer 11 being as empty as usual at the beginning of a non-recording interval 230.

In FIG. 4b the second situation is depicted, according to which this last portion would be completely recorded at the time t2: in this case the recording interval 220 would end with the level 15 in the buffer 11 not being as empty as usual at the beginning of a non-recording interval 230.

In FIG. 4c the third situation is depicted, according to which this last portion would be completely recorded at the time t3, that is at what would be the early stages of the subsequent recording interval 221: in this case a non-recording interval 231 begins with the level 15 in the buffer 11 being nearly full.

The problem solved by the invention can now be fully understood: at the layer jump the level 15 in the buffer 11 may be such that the duration of the following non-recording interval 230, 231 (i.e. the time available before the level in the buffer grows up to a situation of buffer full) is not sufficient to allow the layer jump to take place and especially the adjustment of control parameters that is required thereafter. The consequences are particularly severe because when a buffer overflow occurs, part of the digital signal may be completely lost.

Figure 5A:
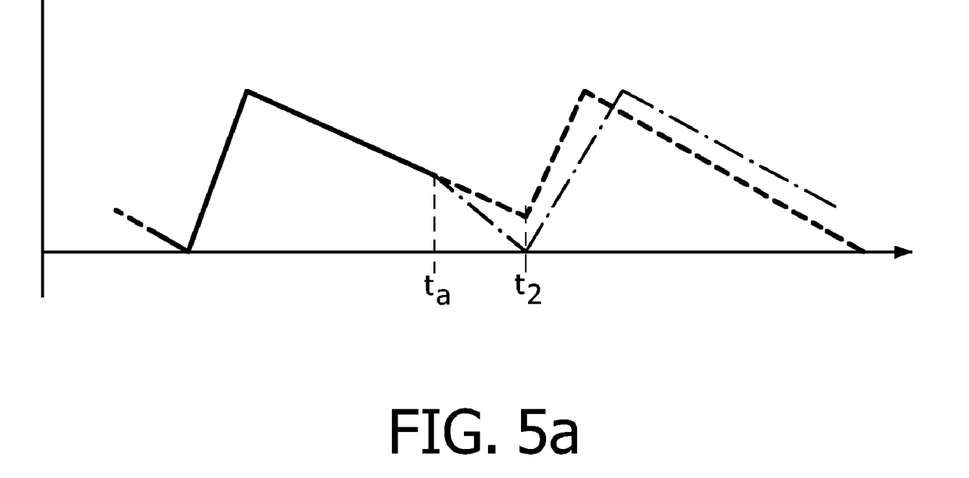
FIGS. 5a-5e show the level of filling in the buffer while recording a digital signal formed by portions, by applying the method according to the invention, including the occurrence of a layer jump, in various situations.
Figure 5B:
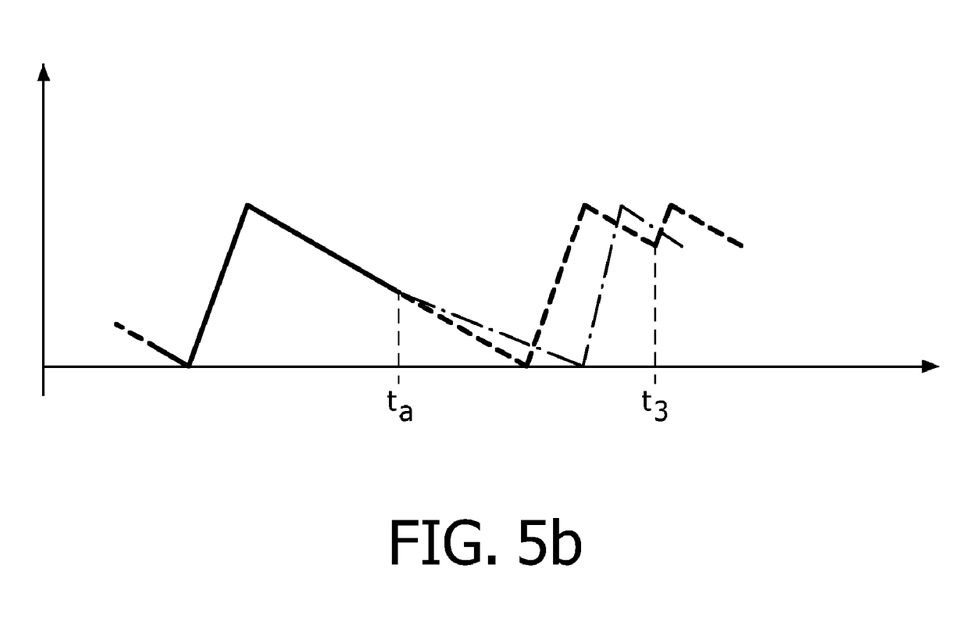

FIGS. 5a and 5b shows the level of filling in the buffer while recording a digital signal formed by portions at the occurrence of a layer jump, by applying the method according to the invention.

In both cases what is done is to adjust the storing rate Rs so as to obtain that the buffer has been emptied down to the predetermined low level when the last portion has been completely recorded.

In FIGS. 5a-5e dashed lines indicate the trend of the level 15 of filling in the buffer 11 after time ta if no adjustment of the storing rate Rs was made, and dotted-dashed lines indicate the actual trend with an adjustment of the storing rate Rs made as according to the invention.

In FIG. 5a, corresponding to the situation in which the last portion would be completely recorded at the time t2 if the storing rate Rs was left unchanged, the storing rate is decreased so as to obtain that the buffer has been emptied down to the predetermined low level 17 when the last portion has been completely recorded.

Similarly, in FIG. 5b, corresponding to the situation in which the last portion would be completely recorded at the time t3 if the storing rate Rs was left unchanged, the storing rate is increased so as to obtain that the buffer has been emptied down to the predetermined low level 17 when the last portion has been completely recorded.

In both cases the storing rate is adjusted at a time ta, and the adjusted value of the storing rate Rs' can be calculated based upon:

Pres(ta), the amount of memory required for recording the residual part of the last portion, Lbuf(ta), the level 15 in the buffer 11, Rr, the recording rate, and Lbuf_low, the predetermined low level 17, from the system of equations:

$$L\text{buf}(ta)-(t-ta)(Rr-Rs')=L\text{buf\_low}$$

$$P\text{res}(ta)-(t-ta)(Rr)=0$$

where ta is the time at which the adjustment is calculated, t is the time when the recording interval ends, and Rs' is the value of the storing rate adjusted that solves the equations.

In the system of equations above the first equation reflects the condition that at the end of the recording interval t the level 15 in the buffer 11 must be equal to Lbuf_low, i.e. the predetermined low level 17; the second equation reflects the condition that residual part of the last portion Pres(ta) must have been completely recorded at the end of the recording interval t. For sake of simplicity it has been assumed that the time ta is during the same recording interval during which the recording of the last portion on the first layer is accomplished.

The second equation can be enhanced by taking into account the effect of Rs' on Pres(ta): in fact when the digital signal 10 is generated as the result of the processing an input signal 21, meaning for example compressing or encoding the input signal 21 with variable compression rate/encoding resolution, then it is clear that that varying the compression rate/encoding resolution has not only the effect of varying the storing rate Rs but also Pres(ta), the amount of memory required for recording the residual part of the last portion.

In this case Pres(ta) must be replaced by Pres(ta,Rs') in the second equation and the exact relation between Rs' and Pres(ta,Rs') can be derived from the algorithm employed for compressing/encoding the input signal 21. Qualitatively this can be described as follows: the time at which the dashed-dotted line goes to zero would be anticipated in FIG. 5a and delayed in FIG. 5b.

Generally, the earlier is ta, the smaller the adjustment needed to solve the above equations.

It is also possible to select ta during earlier recording intervals, even while recording portions earlier that the last one. In this case the system of equations indicated above will have to incorporate a further parameter, being the number of recording intervals in which the recording of the last portion is accomplished. Since this may allow more than one value, there might be multiple solutions to the equation above. This can be seen having regard to FIGS. 5c-5e.

Figure 5C:
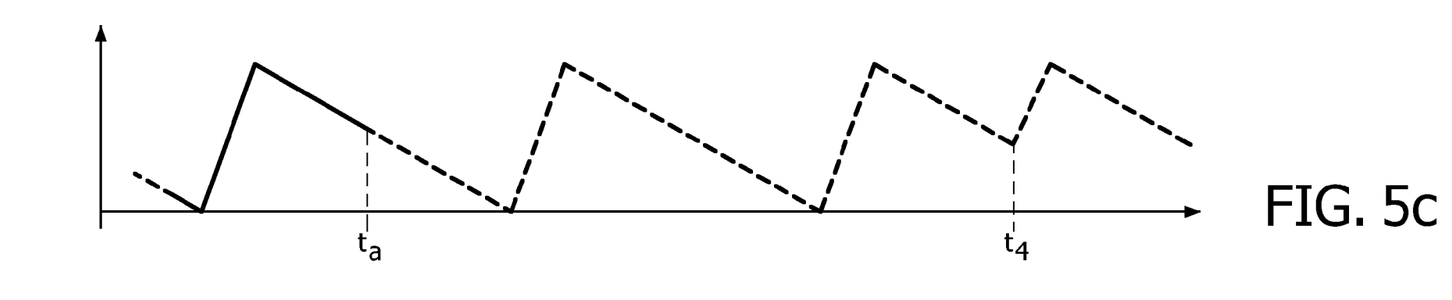

In FIG. 5c a situation is depicted according to which the last portion would be completely recorded at the time t4, if no adjustment was made.

Figure 5D:
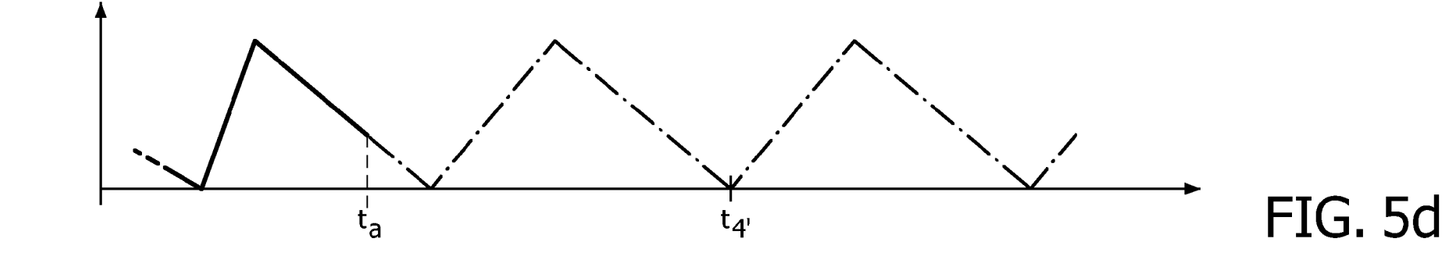

FIG. 5d shows how the situation of FIG. 5c can be handled by decreasing the storing rate, bringing the time at which the last portion would be completely recorded to t4'.

Figure 5E:
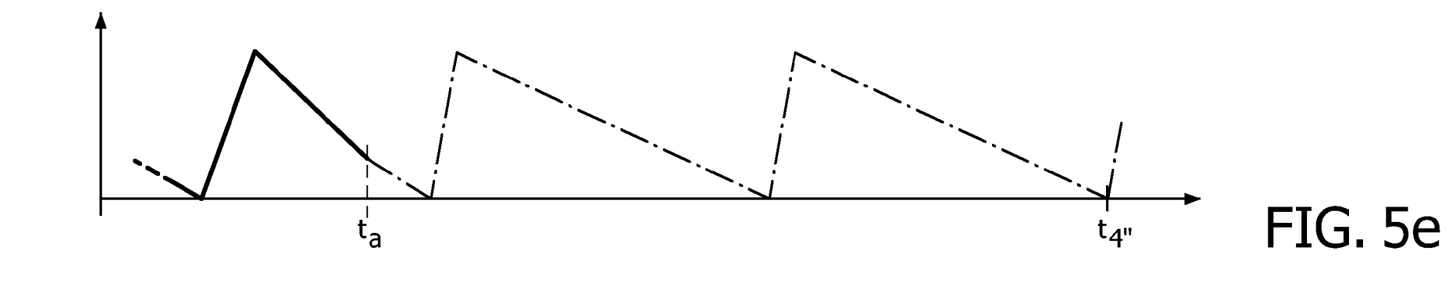

FIG. 5e shows how the same situation of FIG. 5c can be handled by increasing the storing rate, bringing the time at which the last portion would be completely recorded to t4".

If according to one of multiple solutions the storing rate Rs has to be increased, and according to another one of multiple solutions the storing rate Rs has to be decreased, then it is preferable to use the solution according to which the storing rate Rs has to be decreased, since as it has been explained above a lower storing rate leads to a longer time before the buffer is filled up again, i.e. a longer time available for calibrations.

It is also possible to adjust the storing rate Rs several times in successive approximations.

The original value of the storing rate Rs can be restored at any convenient time, for example at the beginning of the non-recording interval during which the layer jump is to take place, or, particularly if the storing rate adjusted has a decreased value, at the beginning of the first recording interval on the second layer.

The described method can be further enhanced by also manipulating the moment when the last recording interval is started, for example by starting it before the usual condition of having the buffer substantially full is verified.

As it has been introduced above, the situation may be given in which the digital signal derives from the processing of an input signal, which input signal is generally not under control: that is the input signal cannot be slowed down, accelerated, or stopped.

In a particularly relevant embodiment the input signal is an analogue signal, for example a real-time audio/video signal, which recording cannot be stopped, the sanction being the loss of the audio/video signal during an interval of time. In this case the digital signal derives from the digitalization of the input signal and it is possible to vary the rate at which the digital signal is generated for example by varying the sampling rate of the analogue signal and/or the resolution of the samples.

If the input signal is real-time audio/video signal the digital signal can be obtained by use of an MPEG encoder, which allows different levels of resolution: in this case the rate at which the digital signal is generated, sometimes referred to as bitrate, can be varied by varying the level of resolution. In this case it is convenient to vary the level of resolution gradually, so as to make the change less abrupt and thus less perceptible.

According to some MPEG encoding methods it is possible to select a constrained variable bitrate instead of a constant bitrate. The constrained variable bitrate is a bitrate which can vary within a range around a nominal value, so as to optimize the visual perception.

All the considerations made above can be extended to the case of a storing rate Rs not constant. However, The fact that the instantaneous value of the storing rate Rs cannot be exactly known at a given moment in future introduces an element of uncertainty which makes it impossible to calculate an exact solution to the system of equations indicated above. This element of uncertainty can be dealt with for example in one of the following ways:

recalculating the storing rate Rs at successive moments, while approaching the end of the last portion, allowing the recording interval to end with a level in the buffer different from zero with a suitable tolerance, or switching temporarily to a constant storing rate Rs.

Once the recording interval has ended the adjustment of parameters necessary to record on the second layer can start. This includes one or more parameters defining the write strategy, i.e. the shape and amplitude of pulses used to write marks onto the recording layer, for which parameters a calibration procedure is necessary. The calibration may comprise a writing trial with different values, or sets of values, and a consequent determination of the best value, or set of values. This calibration can take up to 10-12 seconds.

The invention can be used for limiting the amount of memory required by the buffer 11, where the digital signal 10 has to be temporarily stored while said calibration is being performed.

Clearly, the method according to the invention can be exploited by a digital video-camera using a dual-layer recordable DVD as storage medium.

Figure 6:
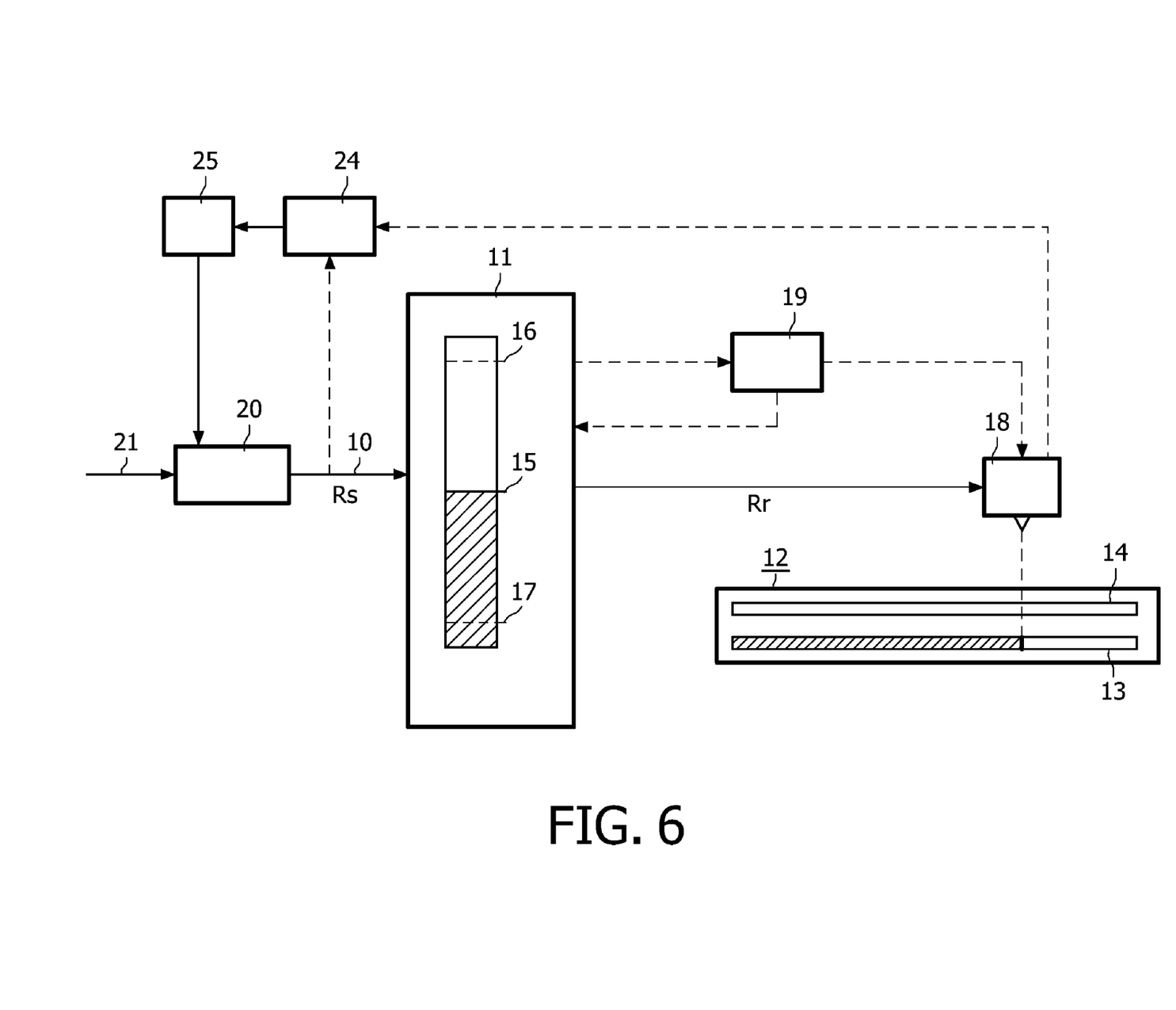
FIG. 6 shows an apparatus according to the invention.

FIG. 6 shows an apparatus according to the invention. In addition to the parts already shown in FIG. 1, the apparatus comprises means for identifying 24 a last frame to be recorded on the first layer 13, and an adjustment unit 25, for adjusting the storing rate Rs so that the buffer 11 has been emptied down to the predetermined low level 17 when the last portion has been completely recorded, for example by varying a compression factor or a level of resolution in encoding, as explained above.

The portions of digital signal can be represented for example by DVD cells, as defined by the DVD Video Standard.

The size of the portions (i.e. DVD cells) is generally not known in advance, but it is known what is their maximum size. So it can be calculated in advance how many portions will fit in a space available at a given moment. The layer jump has to be effected when this number drops to zero, otherwise a situation may occur that the next portion will not fit on one layer completely and the resulting disc will not be fully playable after that point.

It must be noted that the term "comprises/comprising" when used in this specification, including the claims, is taken to specify the presence of stated features, integers, steps or components, but does not exclude the presence or addition of one or more other features, integers, steps, components or groups thereof. It must also be noted that the word "a" or "an"

preceding an element in a claim does not exclude the presence of a plurality of such elements. Moreover, any reference signs do not limit the scope of the claims; the invention can be implemented by means of both hardware and software, and several "means" may be represented by the same item of hardware. Furthermore, the invention resides in each and every novel feature or combination of features.

The invention can be summarized as follows. A recording method, particularly suitable for use in a digital video-camera, is described according to which a digital signal 10, deriving from the encoding of an audio-video signal is temporarily stored in a buffer 11 and from there recorded in a dual layer DVD 12 in successive recording intervals 22 or packets. The start/stop of a recording interval is normally controlled according to the level 15 of filling of the buffer. The digital signal is partitioned in portions that need to be entirely recorded on one single layer, and this triggers the need for a layer jump independently from the level of filling of the buffer. In order to avoid starting a layer jump with the buffer already partly filled, and therefore having a short non-recording interval 23 when time is mostly needed for calibrations, it is proposed to adjust the resolution in the encoding of the audio-video signal so as to have the buffer close to empty when the layer jump occurs.

The invention claimed is:

1. Method of recording a digital signal on an information carrier comprising a first layer and a second layer, comprising the steps of:
   storing the digital signal in a buffer at a storing rate, and
   recording the digital signal stored in the buffer on the first layer, until a storage space available on the first layer is filled, which recording is started when the buffer has been filled up to a predetermined high level, and stopped when the buffer has been emptied down to a predetermined low level,
characterized in that:
   the digital signal is partitioned in a sequence of portions, each portion being recorded completely on one layer,
and by further comprising the following steps:
   identifying a last portion to be recorded on the first layer, and
   adjusting the storing rate so that the buffer has been emptied down to the predetermined low level when the last portion has been completely recorded.

2. Method as claimed in claim 1, characterized by comprising the step of compressing an input signal by a compression factor so as to obtain the digital signal, and wherein in adjusting the storing rate, the storing rate is adjusted by varying the compression factor.

3. Method as claimed in claim 1, characterized by comprising the step of encoding an input signal with a level of resolution so as to obtain the digital signal, and wherein in adjusting the storing rate, the storing rate is adjusted by varying the level of resolution.

4. Method as claimed in claim 3, characterized in that in varying the level of resolution, said level of resolution is varied gradually.

5. Method as claimed in claim 3, characterized in that the input signal is an analogue signal, in particular a real-time audio/video signal.

6. Method as claimed in claim 5, characterized in that in encoding the input signal an MPEG encoder is used.

7. Method as claimed in claim 1, characterized in that the storing rate is a fixed rate.

8. Method as claimed in claim 1, characterized in that the storing rate is a variable constrained rate.

9. Method as claimed in claim 8, characterized in that comprising the step of switching the variable constrained rate to a fixed rate before the step of adjusting.

10. Apparatus for recording a digital signal on an information carrier comprising a first layer and a second layer, comprising:
   a buffer for the storage of the digital signal at a storing rate,
   a recording unit, for recording the digital signal stored in the buffer on the first layer, until a storage space available on the first layer is filled, and
   a start/stop unit for controlling the recording unit to start recording when the buffer has been filled up to a predetermined high level, and stop recording when the buffer has been emptied down to a predetermined low level,
characterized in that:
   the digital signal is partitioned in a sequence of portions, each portion being recorded completely on one layer,
and by further comprising:
   means for identifying a last frame to be recorded on the first layer, and
   an adjustment unit, for adjusting the storing rate so that the buffer has been emptied down to the predetermined low level when the last portion has been completely recorded.

* * * * *